United States Patent Office 2,729,684
Patented Jan. 3, 1956

2,729,684

TREATMENT OF BENZENE HEXACHLORIDE

William T. Donaldson, Aiken, S. C., and James C. Hetrick, Detroit, Mich., assignors to Ethyl Corporation, New York, N. Y., a corporation of Delaware No Drawing. Application November 17, 1952,
Serial No. 321,054

2 Claims. (Cl. 260—648)

This invention relates to the treatment of mixtures of benzene hexachloride (1,2,3,4,5,6-hexachlorocyclohexane) and more particularly to a process for separating and recovering the various isomers thereof.

It is known that benzene hexachloride (BHC) occurs in a number of isomeric forms. For example, in the addition chlorination of benzene, a highly complex mixture results including at least five BHC isomers having approximately the following weight distribution: alpha, 65 per cent; beta, 8 per cent; gamma, 13 per cent; delta, 10 per cent; epsilon, less than 1 percent; and in addition, the several separate isomers of heptachlorocyclohexanes and other impurities. It is also known that the gamma isomer is by far the most insecticidally active BHC isomer. Accordingly, it is desirable to concentrate BHC isomer mixtures with respect to the gamma isomer to facilitate the preparation of improved insecticidal formulations by the elimination of inert isomers and odoriferous constituents thereof.

At the present time the manufacture of a high gamma isomer BHC product involves a very large number of process steps. Following photochlorination of benzene to produce a BHC-benzene solution (usually containing between 10–25 per cent by weight BHC), the product must be obtained in a benzene-free condition. This is usually done by flashing off the benzene and drum flaking the molten product, although steam distillation may also be employed. After such recovery operation, the solid, flaked BHC is extracted with limited quantities of a selective solvent for the gamma isomer, leaving the major quantity of the alpha isomer undissolved and producing an extract containing up to about 40 per cent gamma isomer. This extract is thereafter fractionally crystallized, the crystallization operation being controlled or interrupted when the mother liquor from said crystallization is saturated with the delta isomer. The high gamma crystals so-formed are then redissolved and recrystallized one or more times to effect additional purification of the gamma isomer. Normally, two or more recrystallizations are necessary to obtain at least a 99 per cent pure product, the latter being termed "lindane" when odorless and colorless.

Lower aliphatic alcohols, such as methanol, are most commonly used in the process described above. In combination with the BHC and higher chlorinated impurities thereof, the resulting solution is highly corrosive and difficult to handle and process. In consequence, considerable corrosion is encountered in process equipment, particularly during the extraction and first crystallization steps of the process.

It is accordingly an object of the present invention to provide an improved process for the manufacture of BHC products having a different isomer distribution than that obtained by the chlorination of benzene. Another object is to provide a simplified method for the separation of the gamma isomer from BHC isomer mixtures. Other objects and advantages of the present invention will be apparent from the following description and appended claims.

It has now been found that benzene solutions of BHC isomer mixtures, such as that which is obtained in the chlorination of benzene, can be treated directly to isolate one or more of the isomers of BHC, and, in consequence, eliminate several costly process steps. Fortunately, these eliminated steps of prior processes are the ones in which most difficulty is encountered with corrosion and equipment failure.

According to the present process, the BHC-benzene solution, such as that obtained by additive benzene chlorination, is merely concentrated by benzene removal to a point wherein the gamma isomer is essentially saturated, i. e. to a weight ratio of BHC: benzene of about 3:1–6:1, instead of completely removing the benzene. Under these conditions, substantial portions of the BHC will precipitate as a gamma-free or low gamma isomer fraction. This heterogeneous system is then brought to equilibrium and the phases separated. The filtrate so-obtained, containing essentially all of the gamma isomer, is then concentrated further to effect precipitation of another BHC solid fraction, the latter fraction containing a high concentration of the gamma isomer, sometimes contaminated with some of the relatively low soluble isomers, such as the alpha isomer. Preferably, the latter product is thereafter redissolved in another selective solvent for the gamma isomer, i. e. a lower aliphatic alcohol, such as methanol, and fractionally crystallized therefrom to effect further purification. Further recrystallizations of the product from the same or other solvents can be made although such further refinement of the product is not normally necessary or desirable.

The BHC-benzene ratio to be employed in the first step of the process (removal of the insoluble alpha isomer) is determined by the temperature of the crystallization operation, and the gamma isomer concentration in the crude BHC feed. In general, higher crystallization temperatures permit higher BHC-benzene ratios. Normally, it is preferred to carry out the concentration operation prior to crystallization at the boiling point of the solution and at atmospheric pressure, although reduced or elevated pressures can be employed, if desired.

Following equilibrating the heterogeneous benzene-BHC mixture and separating the solids fraction (primarily alpha isomer) from the gamma isomer-containing extract, crystallization of the extract is induced, as noted above, by concentration of the solution by solvent removal. However, the crystallization can be induced by both solvent concentration and solvent depressant addition, i. e. the addition to the solution of a second liquid which reduces the solubility of the BHC in the benzene. This technique thus induces fractional crystallization of the BHC without unduly increasing the BHC:solvent ratio above that of the extract ratio. Relatively low BHC:benzene ratios have been found most desirable from a material handling standpoint and for convenience and efficiency in the separation of the solid and liquid phases.

The BHC:solvent ratio of the extract (prior to crystallization of the alpha isomer) should be between 3:1 and 6:1. A ratio of 4.5:1 is preferred at 30° C. using 12–14 per cent gamma isomer BHC mixtures. Following separation of the liquid and solid phases, the crystallizer feed should have a BHC-benzene ratio of between 1:1 and 2.5:1. A ratio of 1.7–1.9 is preferred at 30° C. using 12 per cent gamma BHC. After separating the phases and further concentrating benzene solution, the BHC:benzene weight ratio should have increased to between 6:1 and 10:1, with a ratio of between about 7:1 and 9:1 being preferred. When a solvent depressant is added to this high gamma extract, either before or after concentration, the BHC:solvent ratio can be as low as 3:1 to 4:1, if desired. However, beneficial results are obtained in many cases through the use of the solvent depressant even when the BHC:solvent is as high as 10:1.

The solvent depressants useful in the present invention can be any liquid which is miscible with benzene, but which is essentially a non-solvent for benzene hexachloride. Typical examples of such solvent depressants are petroleum ether and other light hydrocarbon fractions, phenols, cresols and the like.

The residence time of the solution in the crystallizer is not critical. In general, longer crystallizer residence periods tend to increase the yield of the product, but at the same time reduce the purity of the product, at least until equilibrium is obtained. Conversely, shorter crystallizer residence periods tend to increase the purity of the product, but only at reduced recoveries of the gamma isomer.

The crystallization product, containing up to 80–95 per cent gamma isomer, can be used as such or can be reprocessed with a selective solvent to increase the gamma isomer purity thereof. This purification is preferably carried out by redissolving the high gamma isomer product in the selective solvent and recrystallizing the BHC therefrom, preferably interrupting the crystallization before equilibrium is attained or at least before all of the BHC has been precipitated from the solution.

The second solvent useful in this invention can be selected from a wide variety of compounds but is preferably of a polar type. Lower aliphatic alcohols are particularly suitable, including methanol, ethanol, isopropanol and the like. Chlorinated hydrocarbons, such as carbon tetrachloride and ethylene dichloride are also suitable. Other solvents useful in purifying the gamma isomer by crystallization techniques are hydrocarbons, ethers and esters.

Any of the above solvents can be modified with additional solvents or solvent depressants to modify the solvent characteristics of the crystallizing system.

If desired, petroleum ether or other solvent depressant can be added to the benzene reactor solution or to the concentrated solution prior to crystallization of the low gamma isomer (high alpha isomer) fraction, to improve the separation efficiency in this operation. When used, lower BHC:benzene weight ratios are preferred than when operating without a solvent depressant.

Example I

Benzene is reacted with chlorine in a tube-type reactor at 40° C. in the presence of actinic light. The benzene:chlorine weight ratio was 7.1. The residence time in the chlorinator was sufficient to effect substantially complete reaction of the chlorine. The benzene hexachloride so-formed was recovered as a 17 per cent by weight solution in benzene. The crude benzene hexachloride contained 13 per cent gamma isomer.

The solution of BHC in benzene (100 parts by weight of solution) was then heated to vaporize the major quantities of benzene solvent, the BHC:benzene ratio following the concentration being 1.8:1. Under these conditions, 48.7 per cent of the original BHC crystallized and was separated in a centrifuge from the liquid phase. The solid phase consisted essentially of the alpha and beta isomers. The filtrate, containing the gamma isomer, was then further concentrated at the boiling point of the solution by the removal of the major portion of the remaining benzene. The so-concentrated solution had a BHC:benzene weight ratio of 3.1:1. To this concentrated solution was added 21 parts by weight of petroleum ether and the resulting solution was crystallized at 30° C. A 10 minute residence time was employed in the crystallizer. The solid and liquid phases were separated and 0.315 parts by weight of BHC product, containing 80 per cent gamma isomer, was recovered. This represented a 32 per cent overall recovery of the gamma isomer.

The 80 per cent gamma product is then redissolved in methanol at 65° C. with approximately 3 parts by weight of methanol per part by weight of BHC. The so-formed solution is then cooled to 30° C. The slurry so-formed is then separated by centrifugation giving a 96 per cent gamma product in 90 per cent recovery, based on the 80 per cent gamma isomer product.

Example II

Example I was repeated except that the BHC:benzene ratio prior to crystallization of the high gamma product was 8:1 and 27.5 parts by weight of petroleum ether were added in the crystallization operation. A 45 minute residence time was employed in the crystallizer. The product contained 54 per cent gamma isomer and the overall recovery was 38 per cent.

Example III

Example II was repeated except that the crystallizer residence time was reduced to 15 minutes. The product contained 55 per cent gamma isomer in a 44 per cent overall recovery.

Example IV

Example I was repeated except that 10.3 parts by weight of petroleum ether were added during the crystallization operation. Using a residence time of 45 minutes, the product contained 56 per cent gamma isomer and the recovery was 45 per cent of the original gamma isomer.

Example V

Example I was repeated except that 17.6 parts by weight of petroleum ether were employed in the crystallization operation. Using a residence time of 15 minutes in the crystallizer, the product contained 89 per cent gamma isomer in 24 per cent recovery.

Example VI

Example I was repeated except that the solution prior to crystallization of the high gamma product had a BHC:benzene ratio of 5:1. Petroleum ether (16.6 parts by weight) was added to this concentrated solution in the crystallization operation. Following a 15 minute residence time in the crystallizer, the product contained 89 per cent gamma isomer in 25 per cent recovery of the original gamma isomer.

When other light petroleum fractions, phenols or the like are substituted for petroleum ether in any of the above examples similar results are obtained.

As is believed apparent from the foregoing, the present invention provides a convenient process for recovering a high gamma isomer product directly from benzene reactor solution, obtained in the chlorination of benzene, which wholly eliminates the vaporization of the benzene at high temperatures and the recovery of the crude BHC in flaked form, such as by drum casting. BHC-benzene solutions are extremely corrosive at the temperatures necessary for complete vaporization of the benzene, particularly when containing small quantities of HCl, water and chlorine, and thus the present process eliminates a troublesome and costly operation heretofore necessary in the manufacture of high gamma BHC products or lindane. In addition, this invention eliminates a number of costly process operations and much expensive process equipment necessary in prior processes.

We claim:

1. A process for the manufacture of benzene hexachloride, comprising chlorinating benzene in the presence of actinic light, the benzene being employed in excess of stoichiometric quantities whereby the benzene hexachloride is obtained in benzene solution, removing a quantity of the benzene sufficient to give a benzene hexachloride to benzene weight ratio between about 3:1 and 6:1 to effect crystallization of a portion of the benzene hexachloride, separating the liquid and solid phases, removing further quantities of the benzene from said liquid phase sufficient to give a benzene hexachloride to benzene weight ratio of between about 6:1 to 10:1, and adding to the solution between about 10 and about 30 percent by weight of a solvent depressant selected from the group consisting of light hydrocarbon fractions and phenols to effect further crystallization of the benzene hexachloride, and recovering the latter crystallized fraction, the latter fraction containing an increased concentration of the gamma isomer.

2. A process according to claim 1 wherein the high gamma crystals are redissolved and recrystallized in a second solvent.

References Cited in the file of this patent

FOREIGN PATENTS 655,686   Great Britain _____ Aug. 1, 1951

OTHER REFERENCES

Leeds et al.: Journal American Chemical Society, vol. 2 (1880), pp. 205–7.